E. ALLEN.
Calendar Clock.
No. 14,645.
Patented April 15, 1856.
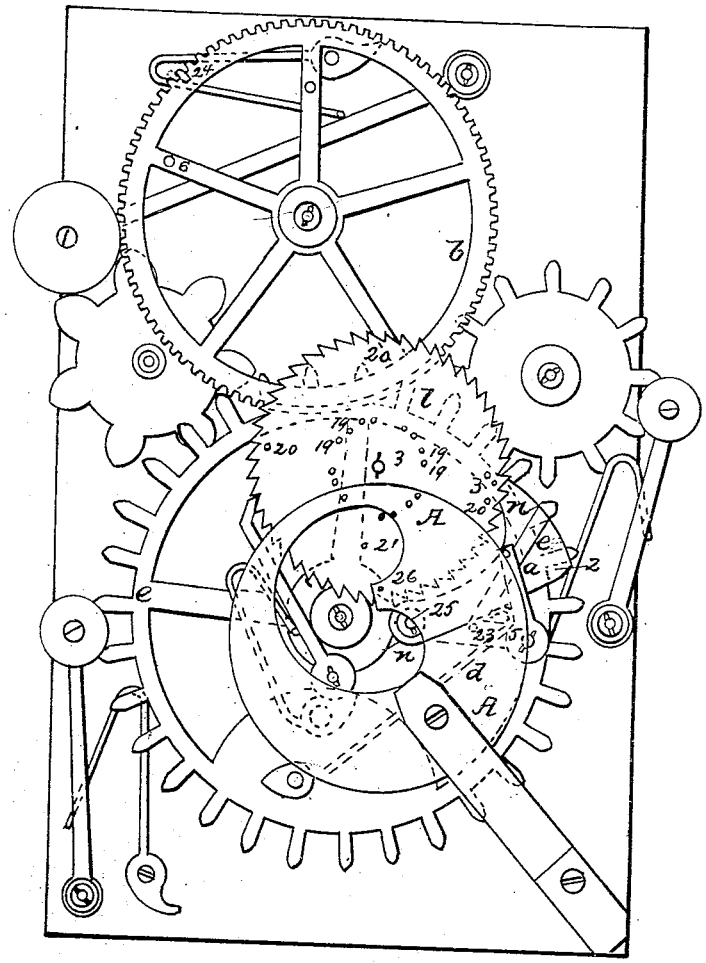

UNITED STATES PATENT OFFICE.

EDWIN ALLEN, OF GLASTONBURY, CONNECTICUT.

CALENDAR-CLOCK.

Specification of Letters Patent No. 14,645, dated April 15, 1856.

*To all whom it may concern:*

Be it known that I, EDWIN ALLEN, of Glastonbury, in the county of Hartford and State of Connecticut, have invented a new and useful Improvement in Calendar-Clocks; and I do hereby declare that the following is a full, clear, and exact description of the same, reference being had to the accompanying drawing, forming part of this specification, which represents a face view of the mechanism of the calendar.

This invention relates to an improvement in the calendar mechanism which is the subject of Letters Patent issued to John Williams dated September 19, 1854. The lever $n$, described in the specification of said Williams through which the wheel of thirty one teeth for showing the days of the month is caused to receive from the twenty-four-hour wheel the overlapping movement necessary at the end of the short months depends upon the force of gravity for its operation, and so will only operate in one position of the clock, and on that account is only applicable to upright clocks.

My improvement consists in a certain method of giving the necessary movement to the said lever $n$, by which it is made capable of operating in all positions of the clock, and is therefore applicable to clocks having what is known as the marine movement.

$e$, is the wheel which shows the days of the month having thirty-one teeth one of which is caught at each revolution of the twenty-four-hour wheel $b$, by a pin 6, projecting therefrom, to give the wheel $e$, one thirty-first (1/31) part of a revolution. $n$, is the lever which is carried by the wheel $e$, and furnished with a lip 2, shown in dotted outline, to be acted upon by a pin 24, on the wheel $b$, for the purpose of moving the said wheel $e$, more than one tooth at the end of a short month. This lever $n$, plays upon a pin 25, attached to the wheel $e$, and moves freely before the pin 24, without moving the wheel until it comes in contact with a pin 23, attached rigidly to the wheel, the quantity of this free motion being determined by a number of pins 19, 20, 21, on the face of what is termed the four year wheel, $l$, which is arranged to turn on a pin 3, carried by the wheel $e$. This wheel $l$, has forty eight teeth one of which at every revolution of the wheel $e$, is caught by a stationary pin 26, and by that means is caused to make one forty-eighth part of a revolution. The months for four years are represented on this wheel by the pins 19, 20, 21, and by spaces between the said teeth, twenty eight spaces representing the long months of thirty-one days; the sixteen pins 19, 19, in the same circle nearest the axis, the months of thirty days; the three pins 20, in the same circle near the periphery, the months of February when that month has twenty-eight days and the pin 21, farther on than 20, the month of February of leap year, when that month has twenty-nine days. The lever $n$, has a spring $d$, which is attached to the wheel $e$, always acting upon it in such a manner as to be forcing its extremity carrying the pin $o$, in toward the center of the wheel $l$, but can only force it as far in that direction as allowed by a pin 4, which is attached to a lever $a$, which hangs on a pin 5, attached to the wheel and which is caused by the revolution of the wheel $e$, to travel around the periphery of a stationary eccentric A. The lever $e$, has a straight projection $e^*$, which rests against this pin.

During the revolution of the wheel $e$, the pin 4, in moving from about the point 7, in the direction of the arrow on the periphery of the eccentric which is where the said periphery approaches nearest to the center of the wheel, is caused to throw out the extremity of the lever $n$, from the center of the wheel to a point beyond the orbit described by the pins 20, around the center 3. When the lever $n$, has thus been thrown out to or nearly to its fullest extent the wheel $l$, is caught by the pin 26, as shown in the drawing, and moved. This movement takes place some time before the end of a month and according to whether the month has thirty-one, thirty, twenty eight, or twenty nine days, the wheel $l$, presents a space, a pin 19, a pin 20, or a pin 21, in the path described by the pin $o$, in its movement toward the center of the wheel as the pin 4, in moving toward the point 7, allows the spring $d$, to force in the lever $n$. If a space be presented, the extremity of the lever moves in as far as the hub of the wheel $l$, and consequently the lever when its lip 2, is caught at the end of the month by the pin 24, is allowed a great amount of free movement toward the pin 23, and the said pin 24, works past it without bringing it so far as the pin 23, and consequently no movement is given to the wheel, but if a pin 19, 20, or 21, is presented, it arrests the pin o, and consequently the lever when acted upon by the pin 24, has less free movement before coming in contact with the pin 24, and causes the wheel e, to leap one, three, or two teeth according as the month may have thirty, twenty eight, or twenty-nine days.

I do not claim the lever n, and its stop pin 23, nor any other parts described in the within named patent of John Williams. But

What I claim as my invention, and desire to secure by Letters Patent, is—

The lever a, with its pin 4, attached to the wheel b, and the eccentric A, applied to the lever n, in combination with a spring d, substantially as herein described, for the purpose of controlling the operations of the said lever in connection with the pins 19, 20, 21, in all positions of the clock movement.

EDWIN ALLEN.

Witnesses:
JOSEPH T. CARPENTER,
RODERICK F. FOWLER.